Feb. 16, 1932.   R. J. WISE   1,845,994
SIGNAL DISTORTION INDICATOR
Filed Dec. 14, 1929    4 Sheets-Sheet 1
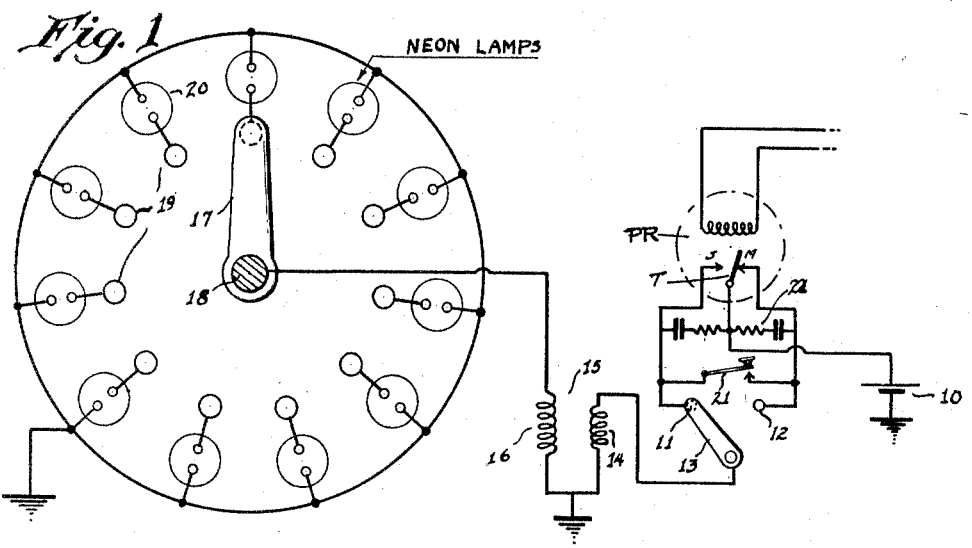
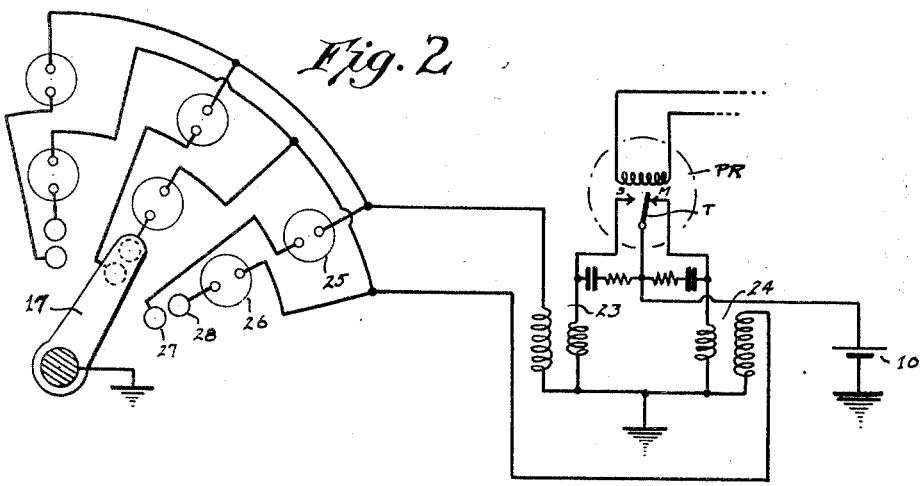
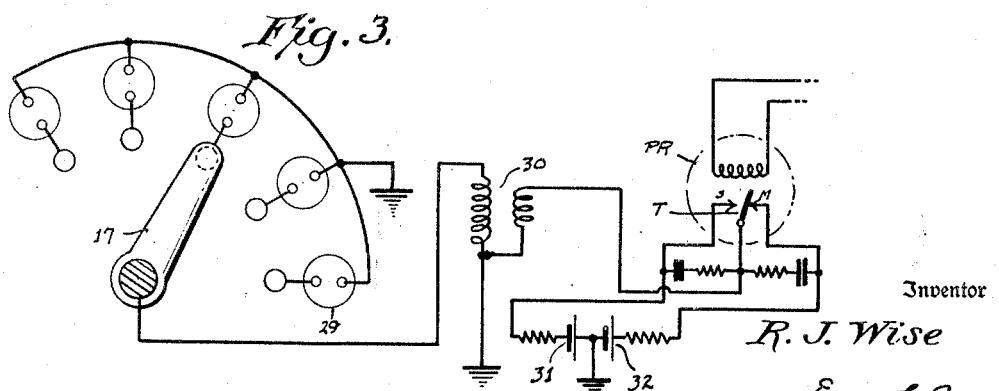
Inventor
R. J. Wise
Eugene C. Brown
Attorney

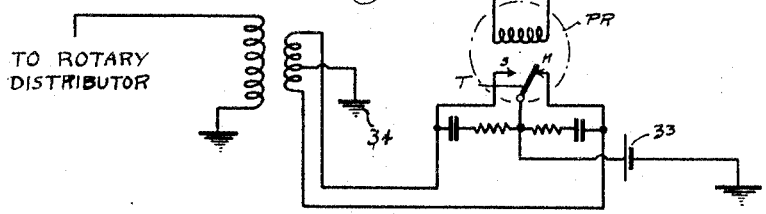
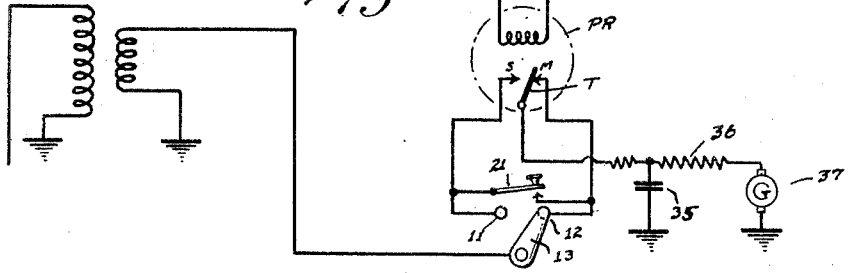
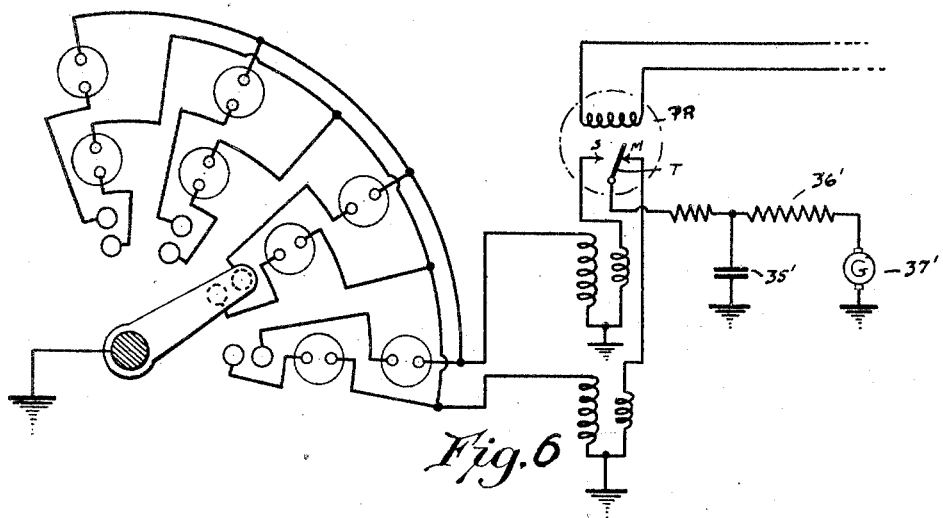
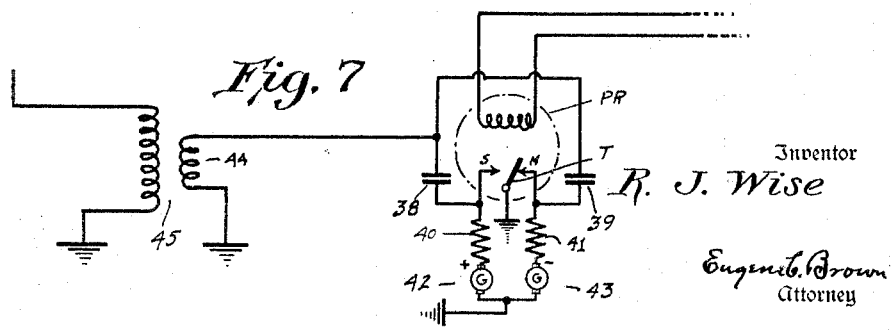

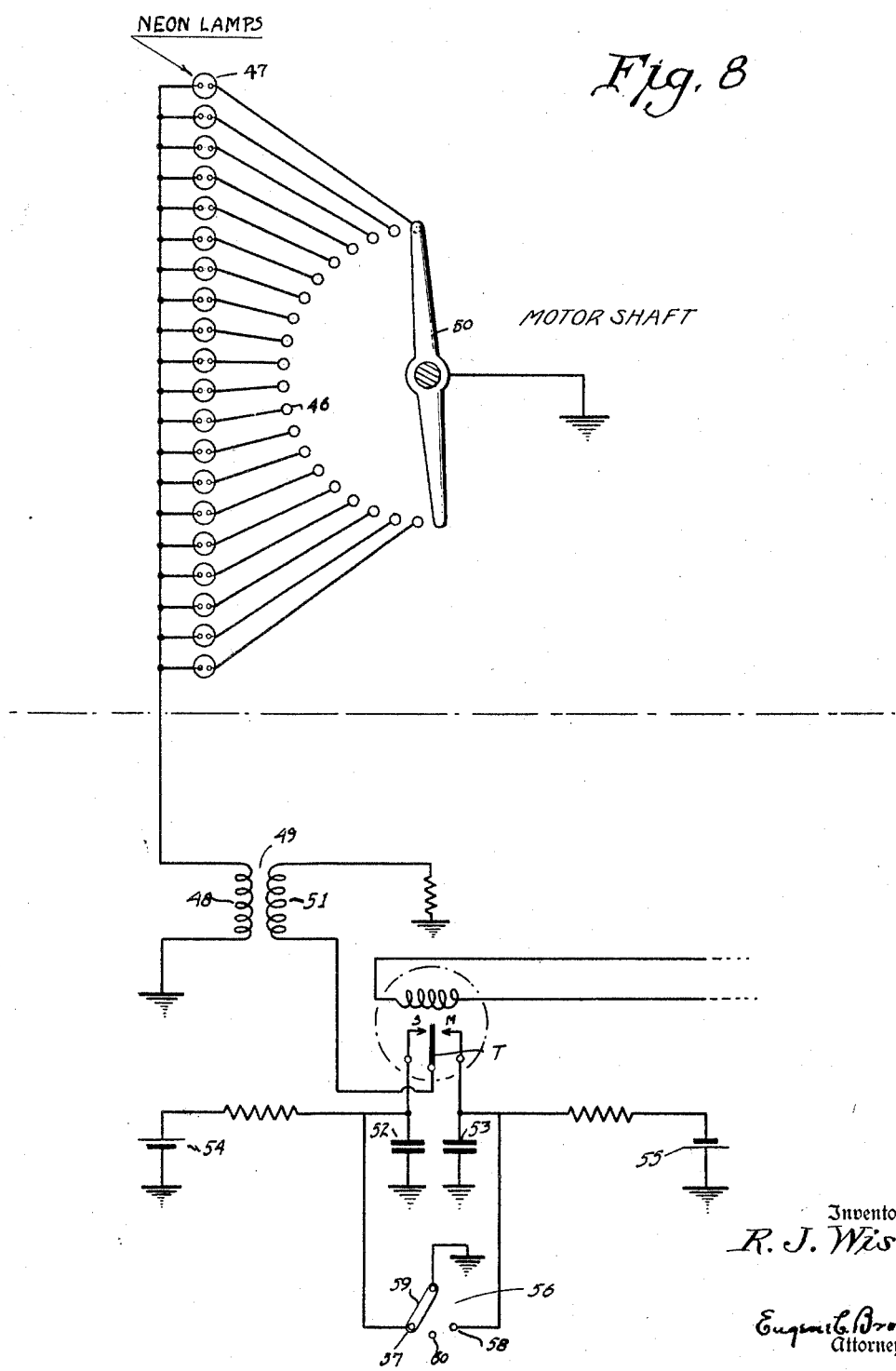

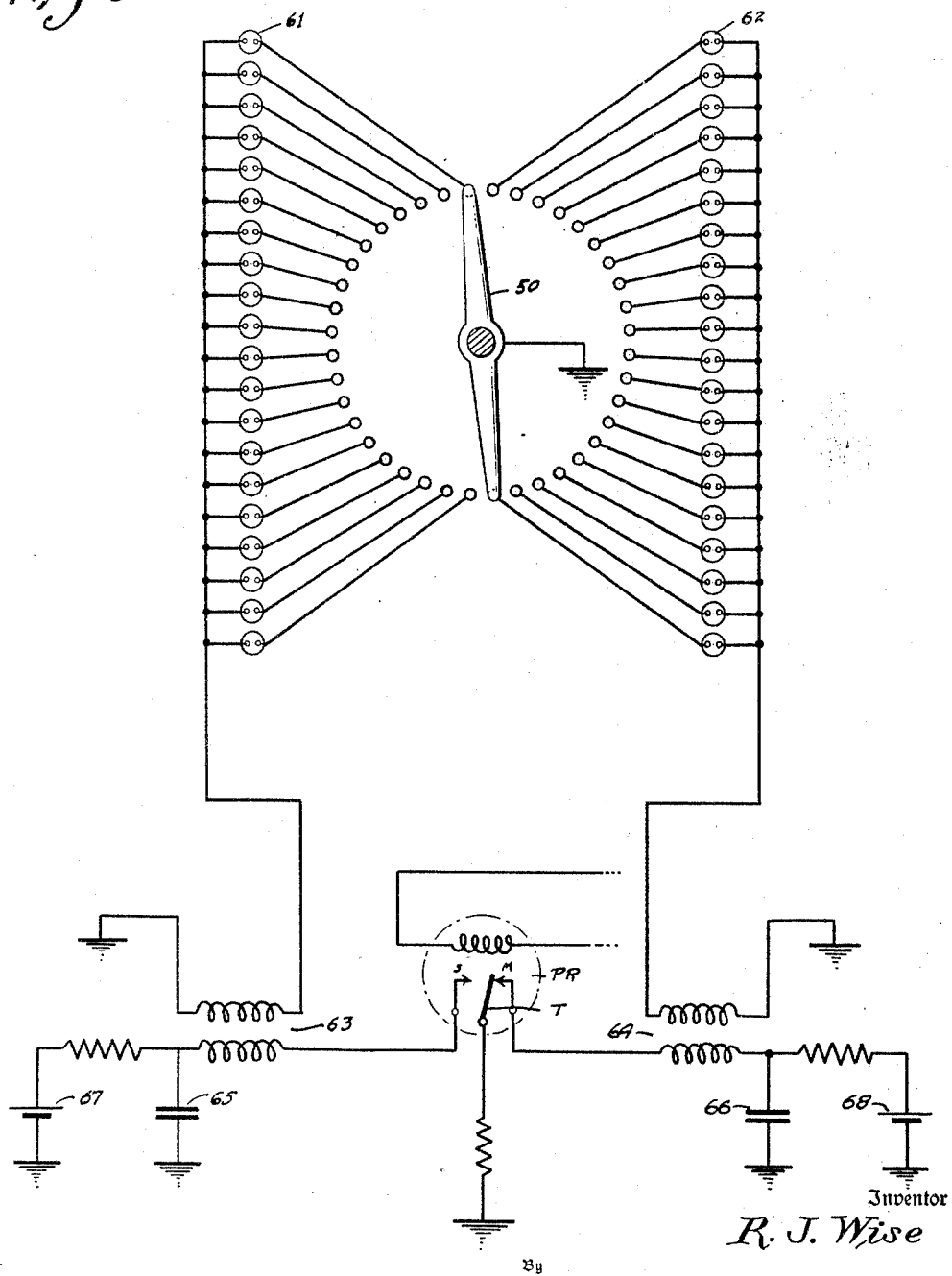

UNITED STATES PATENT OFFICE

RALEIGH J. WISE, OF PLAINFIELD, NEW JERSEY, ASSIGNOR TO THE WESTERN UNION TELEGRAPH COMPANY, OF NEW YORK, N. Y., A CORPORATION OF NEW YORK

SIGNAL DISTORTION INDICATOR

Application filed December 14, 1929. Serial No. 414,100.

This invention relates to telegraph apparatus and more particularly to apparatus for measuring signal distortion in a telegraph system.

In telegraph systems employing certain types of telegraph printing apparatus, the signals are transmitted in the form of a unit code consisting of a uniform number, usually five, of impulses of different combinations of marking and spacing signals, for each intelligence character to be transmitted. The signals are transmitted at a definite and uniform periodicity or frequency and the recording apparatus is operated in synchronism therewith so as to properly respond to each of the impulses to position the selecting mechanism of the printing apparatus. If any serious distortion of the signals occurs, so that one impulse is prolonged into the reception period allotted to another impulse, or should one impulse be clipped or shortened to too great an extent, improper operation of the receiving selector may occur. The distortion may be caused by the bias of the repeating relays employed in the telegraph line, by outside interference, such as induced currents from neighboring lines, by ohmic bias in the line or the like. Since the signal impulses are transmitted at a high rate it is difficult to determine from the improper operation of the receiving mechanism the exact nature and extent of the distortion.

In Patent No. 1,805,349, issued May 12, 1931, and entitled "Signal distortion indicator", I have disclosed a signal distortion indicating apparatus for determining the extent and nature of such distortion, the system involving the use of two light sources, such as an open or enclosed spark gap, an incandescent lamp or a gaseous discharge lamp, revolving in substantial synchronism with the signals, one of said light sources being operated in response to each change in the direction of the received signals. The nature and extent of the distortion is determined by the position of the light source at the instant of illumination.

The present invention concerns an improvement in the distortion indicator described in said copending application, one of the objects of the invention being to provide a signal distortion measuring device for indicating visibly the extent and nature of the distortion, in which the visible indicators are maintained stationary.

Another object is to devise an arrangement of the indicators in which the distortion of both marking and spacing signals may be separately and simultaneously indicated and measured by means of the same group of indicators.

A further object is to provide a signal distortion indicator employing high voltage impulses, generated by changes in the direction of the signal current, to operate a visible indicator, in which sparking at the contacts of the control relay will be eliminated.

Another object is to produce a signal distortion indicator for a telegraph system which is suitable for measuring or indicating the extent and nature of the distortion occurring in individual parts of the system.

Other objects and advantages will appear as the description proceeds.

In accordance with my present invention I provide a rotary distributor having a revolving contact and a plurality of stationary contacts which are traversed thereby. The distributor is associated with the telegraph circuit in which it is desired to measure signal distortion so that upon each change of the signal impulses from a marking to a spacing character, or vice versa, an electrical impulse is transmitted to the distributor. The distributor is rotated in synchronism with the average frequency of the signals so that the actual position of the contact arm, with respect to a fixed reference point, at the instant of a change of direction of the signal current is a measure of the signal distortion.

A separate light source is provided for each of a large number of positions of the contact arm and the light sources are arranged in succession according to a fixed plan, as in a circular row, so that one of the light sources will be illuminated each time an impulse is transmitted to the distributor whereby the position of the contact arm, at the instant of each change in direction of the signal current, will be visibly indicated.

In order that the invention may be more fully understood, reference will be had to the accompanying drawings in which:

Figure 1 is a circuit diagram showing one form of my invention;

Figure 2 is a circuit diagram showing another form of the invention in which a separate group of indicating lamps is provided for both marking and spacing signals;

Figure 3 is a further modification in which both spacing and marking signals are simultaneously indicated on the same group of lamps;

Figure 4 shows a modified arrangement of the impulse generating circuit shown in Figure 3;

Figure 5 is a circuit diagram illustrating a manner of obtaining high voltage impulses by means of a condenser discharge;

Figure 6 illustrates the arrangement of Figure 5 applied to an indicator employing a separate group of lamps for both spacing and marking signals;

Figure 7 is a modification of the impulse generating circuit; employing a condenser discharge;

Figure 8 shows another form of the invention whereby the distributor may be rotated at a lower speed; and Figure 9 shows the system of Figure 8 applied to a distributor having a separate group of lamps for both spacing and marking signals.

Referring to Figure 1 I have shown a polarized relay PR having a movable tongue T and spacing and marking contacts S and M, respectively. The polarized relay is connected to a telegraph system in such manner as to respond to the transmitted signals. It may be a polarized or neutral relay, depending upon the type of signals to which it must respond and it may be connected in series or in shunt to the line relay or it may be in a circuit controlled through the contacts of the line relay. Where it is desired to measure the signal distortion at a repeater station, the relay PR may be connected in a leak circuit from the contacts of the pole changing transmitter. In practical installations jack plug outlets are provided which permit the relay to be connected in any of the above positions.

The tongue T of the relay is connected to one terminal of a grounded source of potential 10. The spacing contact S is connected to a switch contact 11 and the marking contact M is connected to a switch contact 12. A switch arm 13 enables either of the contacts 11 or 12 to be connected to one terminal of the primary winding 14 of an induction coil 15, the opposite terminal of which is grounded. The secondary winding 16 of the induction coil has one grounded terminal, the other terminal being connected to a contact arm 17 of a rotary distributor. The contact arm 17, since it is relatively small and light, may be readily driven from a shaft 18 by means of a small self starting synchronous motor, not shown, driven from the contacts of a tuning fork in synchronism with the signals. Such motors are adaptable to high speed operation with a sufficiently small power consumption to permit the tuning fork control to be entirely practical.

The contact arm 17 revolves over a circular row of contacts 19, each of which is connected to one terminal of one of a group of gaseous discharge lamps 20, the opposite terminal of each of the lamps being grounded. The lamps 20 are preferably small neon lamps of the negative glow type having a starting or breakdown potential of from one hundred to two hundred volts. Such lamps are substantially inertialess and give a distinctive illumination. The contact arm 17 need not actually touch the contacts 19 since the high voltage impulses produced by the spark coil 15 are readily capable of forming a spark between the revolving contact arm and the nearest contact 19 and still produce adequate illumination of the lamps 20. The contacts 19 should be spaced sufficiently close together, with respect to the width of the contact arm 17, so that the contact arm will always be within sparking distance of one of the electrodes. The sparking distance depends upon the voltage available and other factors but may be of the order of an eighth of an inch or more.

With this arrangement one only of the lamps will be illuminated in response to each impulse. This is evident since the operating voltage of such gaseous conduction devices is substantially below their starting potential and even should the impulse occur when the contact arm was equally spaced from each of two contacts, only one of the devices would start, since no two of the lamps have exactly the same characteristics. Immediately upon the discharge occuring in one lamp and ionizing the gas contained therein the voltage drop of the lamp decreases to a value considerably below that of the unoperated lamp. The discharge, therefore, continues through the first of the lamps to break down.

In the operation of the system, the tongue of the relay PR leaves its marking contact at the beginning of a spacing signal and leaves its spacing contact at the commencement of a marking signal. The switch arm 13, in the position shown, controls the flashing of one of the lamps each time the relay tongue T leaves its spacing contact at the commencement of each marking signal.

The contact arm 17 is rotated at a speed substantially corresponding to one revolution for each signal impulse received. This speed may be readily obtained by varying the speed of the contact arm until the same lamp flashes each time an impulse is received from the induction coil. The direction of the speed adjustment of the contact arm is determined by observing the apparent direction of rotation of the flashes which occur as the contact is being brought into speed. If the contact arm revolves at a lower speed than the speed of transmission of the signals, the light flashes will revolve in a direction opposite to the direction of travel of the contact arm, while if the contact arm is rotating at a greater speed than the rate of transmission of the signals, the flashes will appear to rotate in the direction of the travel of the contact arm.

In some cases it may be desirable to attach the device to a terminal multiplex telegraph set and drive it from the brush shaft of the multiplex distributor. This would produce actual synchronism between the indicator contact arm and the signals by virtue of the multiplex synchronizing apparatus. The contact arm having been brought into synchronism with the marking signals, the switch 13 may be thrown over to contact 12 so as to cause the lamps to respond to the spacing signals. If there is no distortion of the signals the flashes will appear in the same position as for the marking signals, indicating that the spacing and marking signals are of equal duration. However, should the spacing signals be of shorter duration than the marking signals, the flashes will occur in advance of the flashing position of the marking signals and if the spacing signals are of longer duration they will cause the flashing to occur at the opposite side of the flashing position of the marking signals. The angular displacement of the two sets of flashes indicates the magnitude of the distortion commonly known as bias.

If the flashing is irregular, jumping from one lamp to another, it is usually an indication of outside interference as, for instance, from neighboring power lines.

It will be apparent that by measuring the distortion occurring at each side of a particular instrument or set of instruments or a section of a line, that the amount of distortion occurring in such instruments or line section may be readily determined.

A key 21 connected across the spacing and marking contacts permits both spacing and marking signals to control the breaking of the primary circuit of the induction coil so that all signals will be placed on the lamps and measured without regard for bias. This may be desirable in order to provide a greater number of flashes in the same region in order to assist the persistence of vision, in determining the signal distortion.

Since the tongue of the relay PR interrupts the primary circuit of the spark coil, I prefer to include a spark reducer 22, comprising a resistance and condenser, between the tongue T and each of the contacts S and M.

In order to provide means for simultaneously and separately indicating the bias occurring in both the marking and spacing signals I have provided separate induction coils 23 and 24 associated with each of the contacts of the relay PR, as shown in Figure 2.

Separate groups of lamps 25 and 26, are also provided for the marking and spacing signals respectively. The distributor, in each radial position has two contacts 27 and 28 corresponding to each group of lamps. In this modification the rotary contact arm 17 is grounded and the outer terminals of each group of lamps are connected to the secondary windings of the respective induction coils. The operation is the same as in Figure 1 except that the lamps of one group flash when changes occur from marking to spacing signals and the lamps of the other group flash when changes occur from spacing to marking signals. The distortion of both types of signals may thus be observed simultaneously. The relative distortion between marking and spacing signals is measured by the angular displacement of the lamps which flash in response to the reception of each type of signals.

In Figure 3 I have shown the gaseous discharge lamps arranged so that changes of signals in both directions may be simultaneously indicated on a single group of lamps. The lamps 29, which may be of the negative glow neon type, have substantially symmetrical electrodes so that the starting potential through the lamp in one direction is equal to the starting potential in the opposite direction. In lamps of the negative glow type, the illumination is concentrated on the surface of the cathode, the anode being dark. One terminal of each of the lamps 29 is grounded, the circuits to the lamps being completed through the rotary contact arm 17 which is connected to the secondary winding of an induction coil 30. The primary winding of the induction coil is connected to the tongue T of the polarized relay PR and the spacing and marking contacts S and M of the relay are connected to grounded batteries 31 and 32, respectively, of opposite polarity.

In the operation of the system, each time the contact tongue T leaves its marking contact an impulse in one direction is produced in the secondary winding of the induction coil to produce a discharge through one of the lamps 29 in one direction so that one of the lamp electrodes, serving as a cathode, becomes illuminated or covered with a negative glow. Upon movement of the relay tongue T from the spacing contact, an impulse of the opposite polarity is obtained through the secondary winding of the induction coil, so as to cause the opposite electrode of one of the discharge lamps to glow. By observing which of the electrodes is illuminated the nature of the signal changes, i. e., whether from marking to spacing or from spacing to marking, may be determined.

In Figure 4 I have illustrated an arrangement for obtaining reversals of polarity through the induction coil by the use of a single battery. The battery 33 has one terminal grounded, the opposite terminal being connected to the relay tongue T. The spacing and marking contacts of the relay are connected to the opposite ends of the primary winding of the induction coil and the midpoint of a primary winding of the coil is grounded, at 34. When the contact tongue T leaves its marking contact a circuit is interrupted through one half of the winding of the primary of the induction coil and when the contact tongue leaves its spacing contact, a circuit is interrupted through the opposite half of the primary winding. The current flows in opposite directions in each half of the primary coil and thereby induces high voltage impulses in opposite directions in the secondary coil. The secondary winding of the induction coil may be connected to the rotary distributor arm 17, as in Figure 3, so as to cause one or the other of the electrodes of the lamps to glow.

In each of the modifications shown in Figures 1, 2, 3 and 4, the relay tongue is employed to open a normally closed circuit to produce the high voltage impulse and as a consequence, sparking occurs at the contacts of the relay. In order to eliminate this sparking I have provided an arrangement whereby the high voltage impulse is obtained upon making of the relay contacts rather than breaking thereof and in Figure 5 such an arrangement is shown.

The contact tongue T is connected through a protective resistance to one side of a grounded condenser 35. The spacing and marking contacts are connected to the primary of the induction coil through a switch 13 as shown in Figure 1. The condenser 35 is charged through a high resistance 36 from a source of potential 37 which may be a 110 volt generator. When the relay tongue is away from its marking contact the condenser 35 is permitted to charge from the source of potential 37 and when the tongue is moved against the marking contact, in response to a marking signal, the condenser 35 discharges suddenly through the primary winding of the induction coil.

This arrangement, in addition to eliminating sparking at the relay contacts, permits a low voltage induction coil, such as an ordinary six volt coil, to be used in connection with a high voltage source of current 37, such as 110 volt source, the latter being more readily available in most instances. Operation of the arrangement shown in Figures 1 to 4 directly from a 110 volt source is not desirable due to the excessive sparking at the relay contacts and to the fact that when employing 110 volts on the primary of the induction coil the number of turns must be increased thus causing the fall in the current in the primary winding to be much less rapid.

In Figure 6 I have applied the principle shown in Figure 5 to an indicator employing a separate group of lamps for both the marking and spacing signals. The arrangement is exactly similar to Figure 2 with the exception that the contact tongue T is connected to the condenser 35' in the manner of Figure 5.

In Figure 7 I have shown a modified scheme of obtaining electrical impulses in opposite directions through the secondary of the induction coil by means of the condenser discharge through the primary winding, whereby a single group of lamps for indicating both marking and spacing signals may be employed. In Figure 7 the tongue T of the relay is grounded and the spacing and marking contacts are connected to one side of condensers 38 and 39, respectively, adapted to be charged through the high resistances 40 and 41, respectively, from the grounded generators 42 and 43. The opposite side of the condensers 38 and 39 are connected to one terminal of the primary winding 44 of the induction coil 45. In this arrangement the condensers 38 and 39 have a charging period equal to the total time that the tongue T is away from the contact associated with each of the condensers, whereas in Figure 6 the charging time of the condenser is equal only to the travel time of the tongue T in one direction. The arrangement shown in Figure 7 enables a high speed relay to be employed having a narrow gap, in which the travel time of the relay tongue is relatively short.

The generators 42 and 43 have their terminals of opposite polarity connected to the condensers 38 and 39 so that upon movement of the tongue T against the marking contact a discharge is obtained through the primary winding 44 in one direction and upon engagement of the tongue T with the spacing contact, a discharge is obtained through the primary winding 44, in the opposite direction.

As stated before the contact arm 17 is rotated one revolution for each impulse of the transmitted signals and since the impulses in high speed printing telegraph systems are exceedingly short it is necessary to revolve the contact arm at a high rate of speed. In Figure 8 is shown an arrangement whereby the contact arm may be rotated a half revolution for each signal impulse. The distributor contacts 46 are arranged in a semicircular row, each contact being connected to an indicator lamp 47, the opposite terminals of the lamps 47 being connected to the grounded secondary winding 48 of the induction coil 49. The rotary contact arm 50 is pivoted at its center, so that each end traverses the contacts 46 alternately, whereby the contacts are traversed twice for each revolution of the motor shaft.

If desired the contacts 46 might be concentrated into a third or a quarter of a circumference and a three or four arm rotary contact provided, in which case the contact arm might be revolved once for each three or four impulses of the signal code.

In Figure 8 the primary winding 51 of the induction coil has one terminal grounded and the opposite terminal connected to the relay tongue T. The spacing and marking contacts are connected to the terminals of the condensers 52 and 53, which are charged from sources of potential 54 and 55, of opposite polarity. A switch 56, having contacts 57 and 58 connected, respectively, to the spacing and marking contacts of the relay is provided for grounding the condensers 52 and 53 selectively.

With the switch arm 59 in the position shown, the condenser 52 is grounded so that the induction coil will respond only to changes from spacing signals to marking signals. If it is desired to have the indicator respond to both spacing and marking signals simultaneously, the switch arm 59 may be positioned on its central contact 60, off of both of the contacts 57 and 58.

Two groups, 61 and 62, of indicating lamps are shown in Figure 9 so that the changes from marking to spacing signals and from spacing to marking signals may be simultaneously observed. The contacts associated with each group of lamps are arranged in two semi circular rows and are traversed by the rotating arm contact 50, twice during each revolution thereof. The circuit to each group of lamps is completed through the secondary windings of separate induction coils 63 and 64. The primary windings of each of the induction coils 63 and 64 have one terminal connected to the spacing and marking contacts respectively of the polarized relay and the opposite terminals connected to the condensers 65 and 66, arranged to be charged from the sources of potential 67 and 68 respectively. The contact tongue T is grounded.

The operation of this arrangement is such that each time the relay tongue T engages its marking contact a discharge occurs through one of the lamps of group 62 and each time the relay tongue engages its spacing contact a discharge occurs through one of the lamps of group 61. The contact arm 50 may be rotated at one revolution for each two impulses of the signal code and the relative distortion of the marking signals indicated by the difference in the horizontal position of the lamps of group 62 which flash in response to signal changes. The distortion of the spacing signals is indicated by the position of the lamps which flash in group 61.

It is obvious that various other arrangements and modifications of the invention will occur to those skilled in the art and I contemplate within the scope of my invention all such arrangements as are embraced within the terms of the appended claims.

What I claim is:—

1. A signal distortion indicator comprising a relay responsive to periodic signals of marking and spacing character, a plurality of light sources arranged in predetermined fixed relation and means operable in substantial synchronism with said signals and controlled by said relay for momentarily operating one of said light sources in response to the change in the signals of one predetermined character to another.

2. In a signal distortion indicator system, the combination with a source of periodic signals, of a relay responsive thereto, a distributor operating independently of said source of signals and in substantial synchronism with the period of said signals and a plurality of lamps operated conjointly by said distributor and relay for visibly indicating the time of operation of said relay in a definite position thereof relative to the normal period of said signals.

3. In combination, a source of periodic marking and spacing signals, a signal distortion indicator comprising a group of visible indicators arranged in a definite fixed relation and means for operating one of said indicators for each change in said signals from marking to spacing and vice versa, said means comprising a rotary distributor operating in substantial synchronism with said periodic signals and having a separate contact segment associated with each of said indicators and a relay having a movable contact responding to said marking and spacing signals for completing a circuit to said indicators through said rotary distributor.

4. A signal distortion indicator for a telegraph system comprising a relay responsive to periodic signals of marking and spacing character, a group of light sources, a rotary distributor having a plurality of fixed contacts connected to said light sources, means controlled by said relay for operating one of said light sources in response to each change from a marking to a spacing signal and vice versa, said lamps being adapted to indicate the direction of each of said changes.

5. A signal distortion indicator for a telegraph system comprising a relay responsive to periodic signals of marking and spacing character, a plurality of gaseous conduction lamps arranged in definite fixed position, means controlled by said relay for producing an electrical impulse each time a predetermined change occurs in said signals and means for distributing said signals to predetermined of said lamps depending upon the time interval of said changes.

6. A signal distortion indicator for a telegraph system comprising a relay responsive to periodic signals of marking and spacing character, a plurality of gaseous conduction lamps having substantially symmetrical electrodes, means controlled by said relay for producing electrical impulses each time a change occurs in said signals from marking to spacing and vice versa and means acting when a change occurs in said signals from marking to spacing for distributing said impulses to one of said lamps in one direction and when changes occur in said signals from spacing to marking for distributing said impulses to said lamps in the opposite direction.

7. A signal distortion indicator for a telegraph system comprising a plurality of gaseous conduction lamps having substantially symmetrical electrodes, means for producing high voltage impulses in response to changes in signals from marking to spacing and vice versa, occurring in said telegraph system, means for distributing said impulses to predetermined of said lamps depending on the time interval of change of said signals, said impulses being of such polarity that one of said electrodes serves as a cathode for changes of said signals from marking to spacing and as an anode for changes of signals from spacing to marking.

8. In a signal distortion indicator for a telegraph system, a source of periodic signals of marking and spacing character, a distributor having a plurality of stationary contacts, such contacts being position in a semi-circular row, a rotating element having two contact arms arranged to traverse said contacts in succession during each revolution thereof, a visible indicator corresponding to each of said contacts and means for completing a circuit to one of said indicators through said rotating element each time a change occurs from a marking to a spacing or from a spacing to a marking signal, said indicators being arranged to show the period of change of said signals.

9. In a signal distortion indicator for a telegraph system, a source of periodic marking and spacing signals, a distributor having a plurality of stationary contacts, a rotating element having a plurality of contact arms, each adapted to traverse said contacts during each revolution thereof, means for operating said rotary element so that one of said arms traverses said contacts during each normal signal impulse period, an indicating device associated with said contacts and means for completing a circuit to said indicating device through said contacts each time a change occurs in said signals from marking to spacing or from spacing to marking, the indicators showing the period of change to said signals.

10. In a signal distortion indicator for a telegraph system, a source of periodic marking and spacing signals, a distributor having a plurality of stationary contacts, a rotating element having a plurality of contact arms, each adapted to traverse said contacts during each revolution thereof, means for operating said rotary element so that one of said arms traverses said contacts during each normal signal impulse period, an indicating device associated with said contacts and means for completing a circuit to said indicating device through said contacts each time a change occurs in said signals from marking to spacing or from spacing to marking, comprising a relay responsive to said periodic signals and having a movable tongue, a condenser, means for charging said condenser when said tongue is away from one of its contacts, said condenser discharging through said indicating device when the tongue engages said contact.

In testimony whereof I affix my signature.

RALEIGH J. WISE.